(12) United States Patent
Ohba et al.

(10) Patent No.: US 10,216,672 B2
(45) Date of Patent: Feb. 26, 2019

(54) SYSTEM AND METHOD FOR PREVENTING TIME OUT IN INPUT/OUTPUT SYSTEMS

(71) Applicant: INTERNATIONAL BUSINESS MACHINES CORPORATION, Armonk, NY (US)

(72) Inventors: Nobuyuki Ohba, Miyagi-ken (JP); Seiji Munetoh, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 14/982,009

(22) Filed: Dec. 29, 2015

(65) Prior Publication Data

US 2017/0185551 A1 Jun. 29, 2017

(51) Int. Cl.
*G06F 13/372* (2006.01)
*G06F 13/16* (2006.01)
*G06F 13/42* (2006.01)

(52) U.S. Cl.
CPC ........ *G06F 13/372* (2013.01); *G06F 13/1673* (2013.01); *G06F 13/4282* (2013.01)

(58) Field of Classification Search
CPC . G06F 13/372; G06F 13/1673; G06F 13/4282
See application file for complete search history.

(56) References Cited

U.S. PATENT DOCUMENTS

| 8,843,175 | B2 | 9/2014 | Nukala | |
| 2008/0291936 | A1* | 11/2008 | Lee | H04L 47/10 370/412 |
| 2009/0164681 | A1* | 6/2009 | Elhamias | G06F 13/385 710/117 |
| 2009/0264128 | A1* | 10/2009 | Tomisawa | H04W 36/30 455/436 |
| 2011/0141954 | A1* | 6/2011 | Song | H04H 60/11 370/310 |
| 2011/0289222 | A1* | 11/2011 | Scheibel | H04L 65/4023 709/227 |
| 2013/0326641 | A1* | 12/2013 | Minaguchi | G06F 21/10 726/30 |
| 2014/0226634 | A1 | 8/2014 | Voigt | |

* cited by examiner

*Primary Examiner* — Henry Tsai
*Assistant Examiner* — John Roche
(74) *Attorney, Agent, or Firm* — Tutunjian & Bitetto, P.C.; Vazken Alexanian

(57) ABSTRACT

Described is a computer-implemented method for preventing time out during data transfer to an input/output device. Dummy data is generated and transferred to the input/output device at a time during data transfer, such as when a time out event may occur that would end the data transfer. The transfer of dummy data prevents a time out event from occurring.

20 Claims, 9 Drawing Sheets

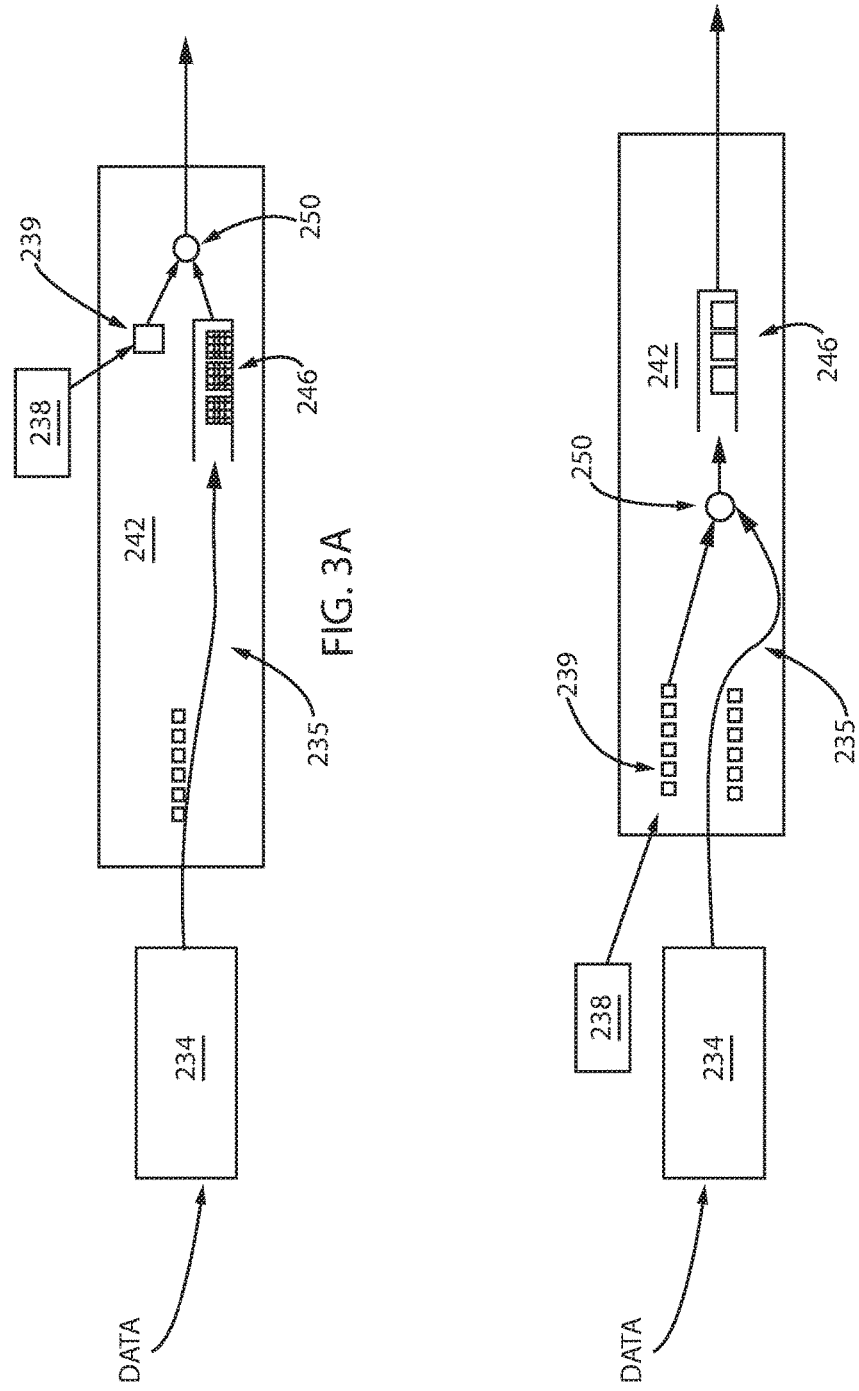

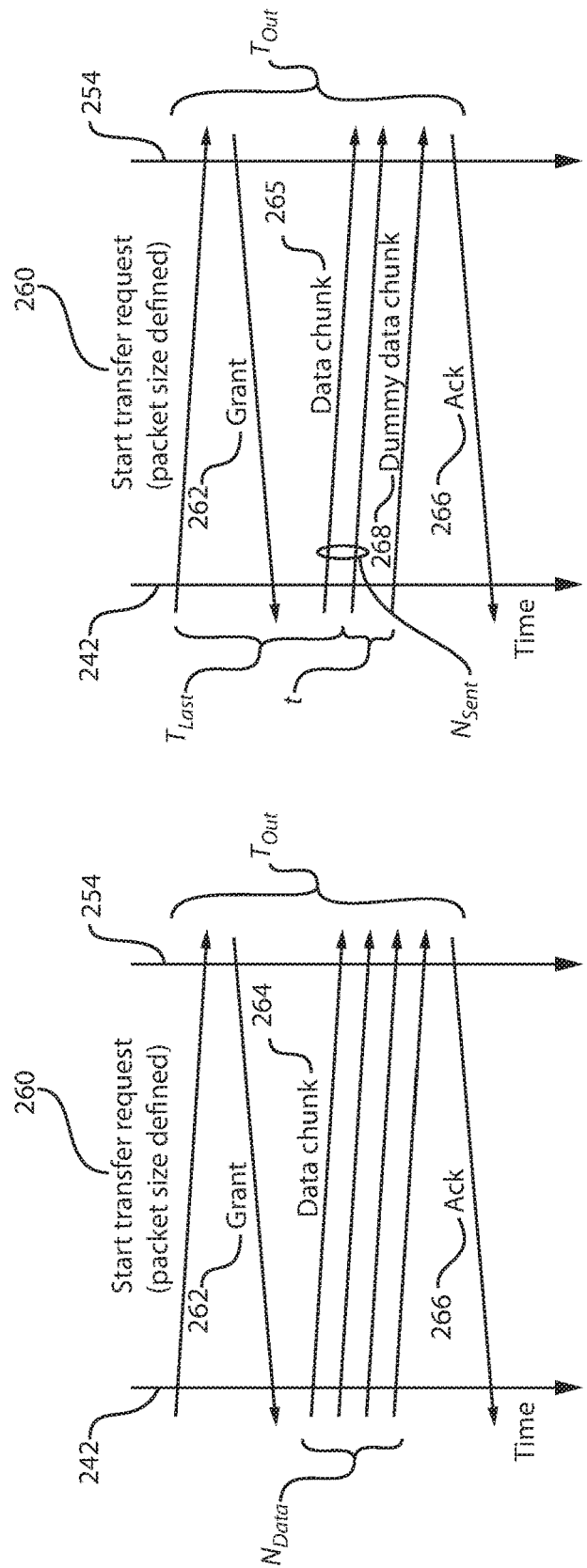

SYSTEM AND METHOD FOR PREVENTING TIME OUT IN INPUT/OUTPUT SYSTEMS

BACKGROUND

Technical Field

The present invention generally relates to data management, and in particular, to the preventing of timing out during the transmission of data to an input/output (I/O) device.

Description of the Related Art

During transfer of data in packets, an I/O controller may send a "start transfer" request to an I/O device and then wait for the I/O device to return a "grant" message. Upon grant, the I/O controller sends data to the I/O device, and the I/O device returns "ACK", e.g., acknowledged, after it receives the data, which is transmitted in a predefined quantity. The transfer sequence must be completed in a predetermined period bounded by a $T_{out}$ time limit Should data transfer not complete before reaching the $T_{out}$ time limit, the I/O device reaches $T_{out}$ and returns a "$T_{out}$ error" to the I/O controller. The data that previously arrived at the I/O device will be discarded, and the process has to be started again.

The quantity of data to be transferred is broken into packets in the I/O controller. The packets may be so large that the I/O controller cannot buffer the packet at one time. As such, packet retransmission cannot be employed due to the data lost in the $T_{out}$ event.

SUMMARY

Described herein according to present principles is a method for preventing time out from occurring during transfer of data to an I/O device. According to the method, a quantity of data to be subjected to a data transfer is stored in computer memory. The quantity of data is transferred in a data stream to an I/O device in packets of data. To prevent a time out event from occurring that would end data transfer, dummy data is generated at a designated time before the time out event. The generated dummy data is inserted into the data stream, which prevents time out from occurring. The process continues until the transfer of the quantity of data is completed. One or more of these operations may be performed by a hardware processor.

Also described herein according to present principles is a system for preventing time out from occurring during transfer of data to an I/O device. The system includes one or more processors including memory for storing a quantity of data to be transferred to an I/O device in a data transfer. Also part of the system is a data prober that probes the quantity of data and forwards it to an I/O controller. The I/O controller breaks the quantity of data into data packets and transfers the data packets in a data stream to the I/O device, which receives the data stream. The system further includes a data dummy generator that generates dummy data and inserts it into the data stream. The data dummy generator performs the generating and inserting at a selected time in order to avoid a time out condition from occurring during the data transfer. This system effectively completes data transfers while preventing and/or avoiding time out conditions.

Still further in accordance with present principles, described is a computer program product for preventing time out from occurring during transfer of data to an I/O device, the computer program product comprising a non-transitory computer readable storage medium having program instructions embodied therewith. The computer-executable program instructions cause the computer to perform a method that includes an instruction to store a quantity of data to be subjected to a data transfer in computer memory. There are further instructions to transfer the quantity of data in a data stream to an I/O device in packets of data, and to generate dummy data at a designated time before data transfer will time out. When dummy data is generated, there is an instruction to insert the dummy data into the data stream. The process continues until the transfer of the quantity of data is completed.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 3A shows an embodiment of dummy data being generated and inserted into a stream of data that is being transferred to an I/O device, in accordance with the present principles;

FIG. 3B shows another embodiment of dummy data being generated and inserted into a stream of data that is being transferred to an I/O device, in accordance with the present principles;

FIG. 4A shows a transmission of a data packet from an I/O controller to an I/O device, with no generation and transmission of dummy data, in accordance with present principles;

FIG. 4B shows a transmission of a data packet from an I/O controller to an I/O device, with the generation and transmission of dummy data, in accordance with present principles;

DETAILED DESCRIPTION

The present principles are directed to systems and methods for preventing time out from occurring during transfer of data to an I/O device. According to same, the system stores, in a computer memory, a quantity of data to be subjected to a data transfer; transfers the quantity of data to an I/O device in packets of data, generates dummy data, sends the dummy data to the I/O device to prevent a time out event from occurring, and completes the transfer of the quantity of data to the I/O device.

According to present principles, the data is broken into packets of data, and the data packets are sent to the I/O device in a data stream. In one embodiment, data packet size is fixed, and packet size cannot be changed once packet transfer has started. In one other embodiment, the I/O controller cannot buffer the whole packet at one time because the size of the data packet is too large to allow for it.

In one other embodiment, the I/O controller sends the heading part of the packet to the I/O device before all the data for the packet arrives from the data prober. This reduces latency in the transfer process.

In one other embodiment, data input may temporarily stop. If this happens, packet transfer from the I/O controller to the I/O device may stop, even in the middle of a packet transfer.

It is believed that, with practice of the system and method according to present principles, the number of time out events that occur will be significantly limited, if not totally eliminated, as should be apparent from the disclosure that follows.

In one embodiment according to present principles, the system and method inserts dummy data into the data stream that is flowing to the I/O device, e.g. a stream of data packets flowing to the I/O device, at an insertion point before the data enters a data buffer in the I/O controller. In one other embodiment according to present principles, the system and method the system and method inserts dummy data into the data stream that is flowing to the I/O device, e.g. a stream of data packets flowing to the I/O device, at an insertion point after the data enters a data buffer in the I/O controller.

Figure 1:
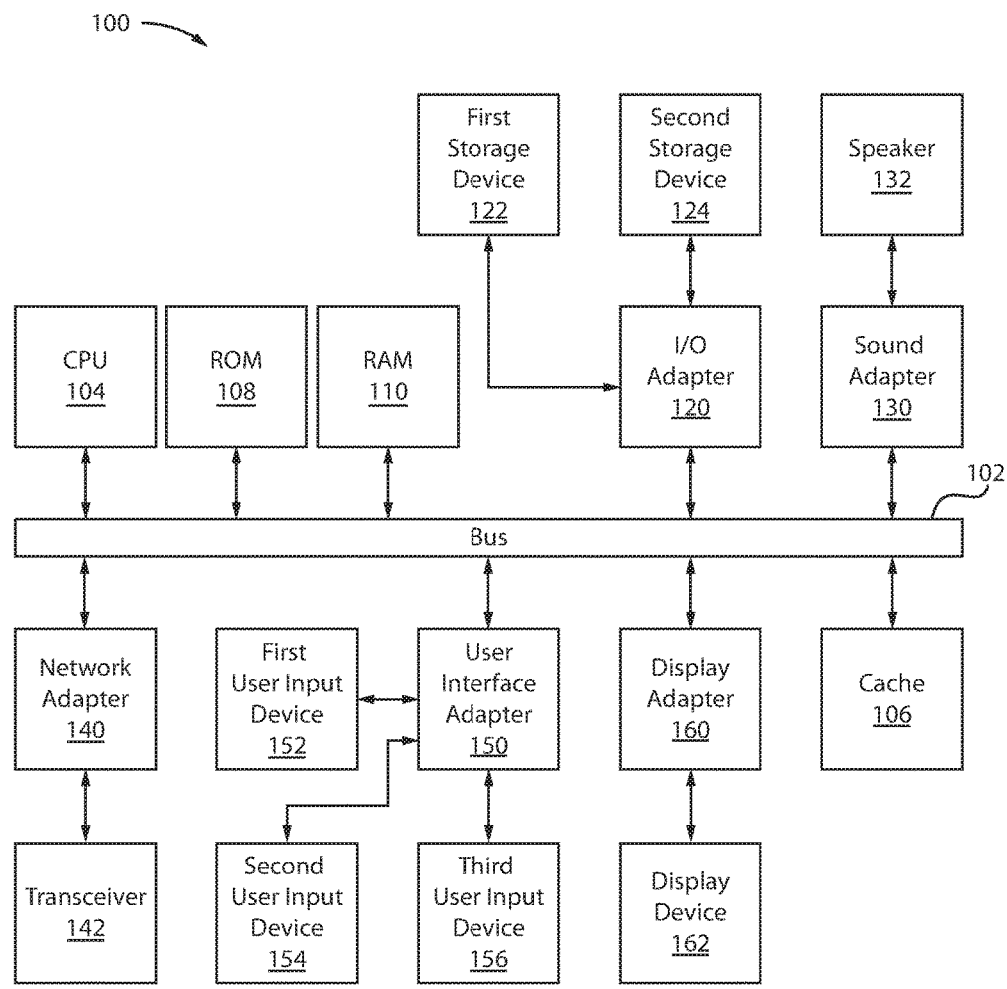
FIG. 1 shows an exemplary processing system to which the present principles may be applied in accordance with an embodiment of the present principles.

Referring to FIG. 1, an exemplary processing system 100 to which the present principles may be applied is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154 and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

The processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. It is to be appreciated that the terms processors and controllers can be used interchangeably herein. These and other variations of the processing system 100 are readily contemplated by one of ordinary skill in the art given the teachings of the present principles provided herein.

Figure 2:
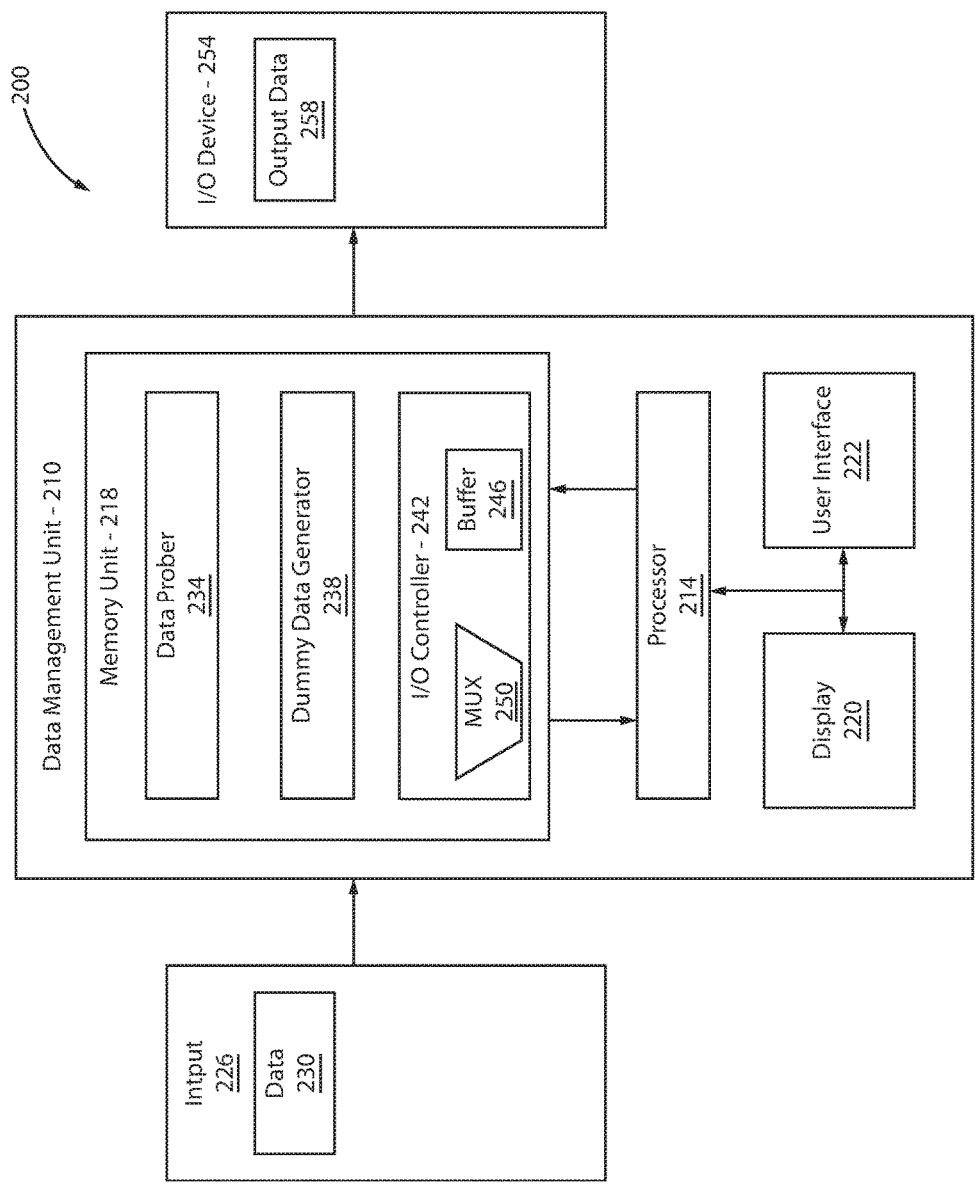
FIG. 2 shows an exemplary system for preventing time out from occurring during transfer of data to an I/O device and the components thereof, in accordance with an embodiment of the present principles.

Referring to FIG. 2, system 200 for implementing respective embodiments of the present principles is shown. Part or all of processing system 100 may be implemented in one or more of the elements of system 200.

Further, it is to be appreciated that processing system 100 may perform at least part of the method described herein including, for example, at least part of method 300 of FIG. 3. Similarly, part or all of system 200 may be used to perform at least part of method 300 of FIG. 3.

System 200 is an exemplary system for preventing time out from occurring during transfer of data to an I/O device, in accordance with an embodiment of the present principles.

System 200 is shown with respect to an operational environment in which it can be utilized, in accordance with an embodiment of the present principles.

System 200 preferably includes a data managing unit 210 that includes one or more processors 214 and memory unit 218 for storing applications, modules and other data. The system 200 may also include one or more displays 220 for viewing content. The display 220 may permit a user to interact with the system and its components and functions. This may be facilitated by the inclusion of a user interface 222, which may include a mouse, joystick, or any other peripheral or control to permit user interaction with the system and/or its devices. It should be understood that the components and functions of the system may he represented as one or more discrete systems or workstations, or may be integrated as part of a larger system or workstation.

System 200 is depicted as a computer implemented approach for preventing time out from occurring during transfer of data to an I/O device, resulting in smoother, more efficient data transfers. The data transfers are completed, e.g., the data transfers do not time out, in a relatively high percentage of occurrences.

System 200 receives input 226, which may include a quantity of data 230 to be processed and transferred to an I/O device. The quantity of data may be stored in the memory unit 218 of the data managing unit 210.

The data managing unit 210 includes a data prober module 234, a data dummy generator module 238, and an I/O controller module 242. In one embodiment of the present principles, data prober module 234, data dummy generator module 238, and I/O controller module 240 are configured in the memory unit 218 that operatively communicates with the processor 214.

The data prober module 234 probes the quantity of data 230 and forwards the data to the I/O controller 242. The data prober receives the data and converts it to a format that is readable by the I/O controller 242. By way of example, the data prober can be an electrical probe, voltage level converter, data sampler, serial-parallel converter, parallel-serial converter, and a data buffer.

The I/O controller breaks the quantity of data into data packets for transferring the data packets in a data stream to the I/O device 254.

In one embodiment, a data buffer 246 is configured in the I/O controller 242. Data buffer receives data from the data prober 234 and assembles the data into data packets. From buffer 256, the data packets are transferred to the I/O device in a data stream.

Data dummy generator module 238 generates dummy data to be included in the data stream transferred to the I/O device. By including dummy data in the data stream, the time out event is prevented from occurring. As shown in FIG. 2, data dummy generator 238 is a separate module configured within the data managing unit 210. In another embodiment, the data dummy generator could be configured within the I/O controller 242.

The I/O controller 242 is configured to have a data buffer 246, where data packets are formed and sent to the I/O device 254. I/O controller is further configured to have a multiplexor ("MUX") 250, for sequencing the transfer of the data packets and the dummy data in the data stream.

Referring to FIG. 3A, the data dummy generator module 238 generates and inserts dummy data 239 into the data stream 235 that is being transferred to the I/O device (not shown) at a point downstream of the data buffer 246. The multiplexor 250 controls, e.g., sequences, the flow of data packets and dummy data in the data stream. Multiplexor unit receives data packets and dummy data at a point downstream the of data buffer 246. With this arrangement, a continuous flow of data is provided to the I/O device in a manner that prevents a time out event from occurring.

Referring to FIG. 3B, the data dummy generator module 238 generates and inserts dummy data 239 into the data stream 235 that is being transferred to the I/O device (not shown) at a point upstream of the data buffer 246. A multiplexor unit 250 is provided for controlling, e.g., sequencing the flow of dummy data and data packets in the data stream. Multiplexor unit receives data packets and dummy data at a point upstream of the data buffer 246. In this arrangement, the dummy data 239 passes through the data buffer, and a continuous flow of data is provided to the I/O device in a manner that prevents a time out event from occurring.

In one embodiment, the system monitors the time that has passed since the data prober module 234 has sent data to the I/O controller 242. If data has not arrived for a selected time period t, then the data dummy generator 238 will generate dummy data to be inserted into the stream of data being transferred to the I/O device 254. This operation can be controlled by the data dummy generator 238, or by another system component, e.g., the processor 214.

Figure 3C:
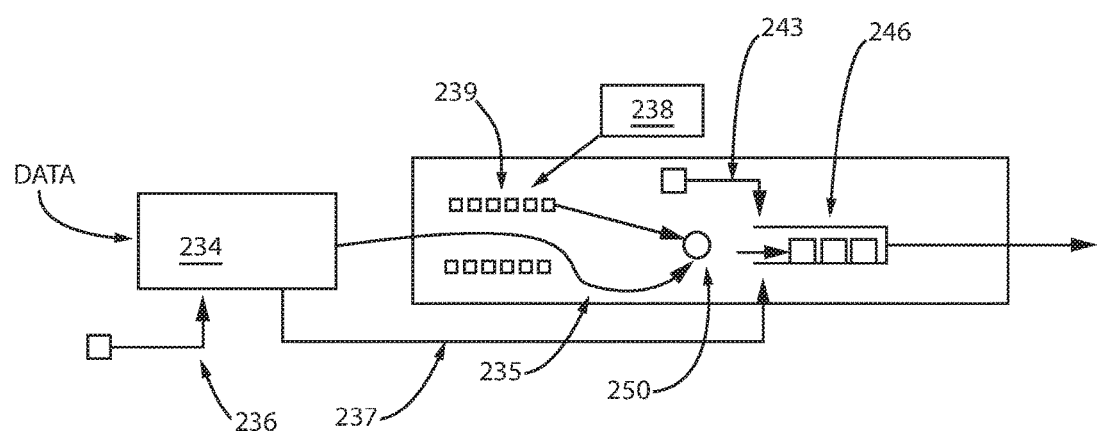
FIG. 3C shows another embodiment according to present principles showing dummy data being generated and inserted into a stream of data that is being transferred to an I/O device in accordance with the present principles, in an arrangement in which data streams are synchronized with clock timers.

Referring to FIG. 3C, another embodiment according to present principles is shown. The receipt of data by the data prober 234 is synchronized by an input data clock 236. Data 235 from the data prober is received by the data buffer 246 of the I/O controller 242 (through multiplexor 250). Receipt of data by the data buffer 246 is synchronized by a buffer input clock 237, generated from the input data clock 236. When the flow of input data from the data prober to the I/O controller stops, then the input data clock 236 also stops. In one embodiment, the dummy data generator 238 detects the stoppage of the input data clock 236, and generates an alternative clock 243 to coordinate dummy data generation and transfer of dummy data 239 through multiplexor 250 to the data buffer 246.

In one embodiment, the system generates dummy data in the following manner $T_{out}$ is the time out time, which could be selected by the system or the system operator. $N_{data}$ is the number of data units that composes one data packet. $T_{last}$ is the time since the data was last sent to the I/O device. $N_{sent}$ is the number of data units that have been sent to the I/O device.

I/O controller 242 generates dummy data, and the dummy data is sent to the I/O device in the data stream if data has not been transferred to the I/O device for a selected time period t. In one embodiment, t has a predefined fixed value. In an embodiment in which t has predefined fixed value, t can be determined as follows:

$$t=T_{out}/N_{data},$$

where $T_{out}$ and $N_{data}$ are a defined above.

In one other embodiment, t is a variable, and its value can be determined as follows:

$$t=(T_{out}-T_{last})/(N_{data}-N_{sent}),$$

where the values of the equation inputs are as defined above.

Referring to FIG. 4A, I/O controller 242 sends a Start Transfer Request 260 to I/O device 254, requesting to send a data packet of a defined size. I/O device 254 replies with a "Grant" 262, authorizing the I/O controller 242 to commence with transfer of the packet. I/O controller 242 sends a data chunk 264 to the I/O device 254, the size of which corresponds to $N_{data}$, e.g., the number of data units that composes one data packet. The I/O device 254 acknowledges receipt of the data packet by sending "Ack" 266, e.g., an acknowledgement that data packet has been received by the I/O device 254.

Referring to FIG. 4B, I/O controller 242 sends another a Start Transfer Request 260 to I/O device 254, requesting to send another data packet of a defined size. I/O device 254 replies "Grant" 262, authorizing the I/O controller to commence with transfer of the packet, I/O controller sends a data chunk 265 that is smaller than the data chunk sent in FIG. 4A. This may occur if the data transfer system employs a latency-reducing strategy in which a part of a packet is transferred to the I/O device before the packet is fully assembled. The value of $T_{last}$, the time since the last data packet was sent to the I/O device, is in excess of the value for t, and thus the data dummy generator generates dummy data, e.g., a dummy data chunk 268 and sends same to the I/O device 254 as part of the data stream. I/O device then acknowledges receipt of the data. In this manner, time out of data transfer is prevented.

In one embodiment, in order to distinguish the dummy data from the good data that is the true subject of the data transfer, the data dummy generator module 238 tags the dummy data to identify it. For example, dummy data can include one or more of a time stamp, voltage, bus utilization, packet sequence number, and other indicators of the state of the system.

The preceding description is intended to merely be illustrative. Thus, one of ordinary skill in the art will contemplate various other ways for preventing time out during the transfer of data to an I/O device, while maintaining the spirit of the present principles.

Figure 5:
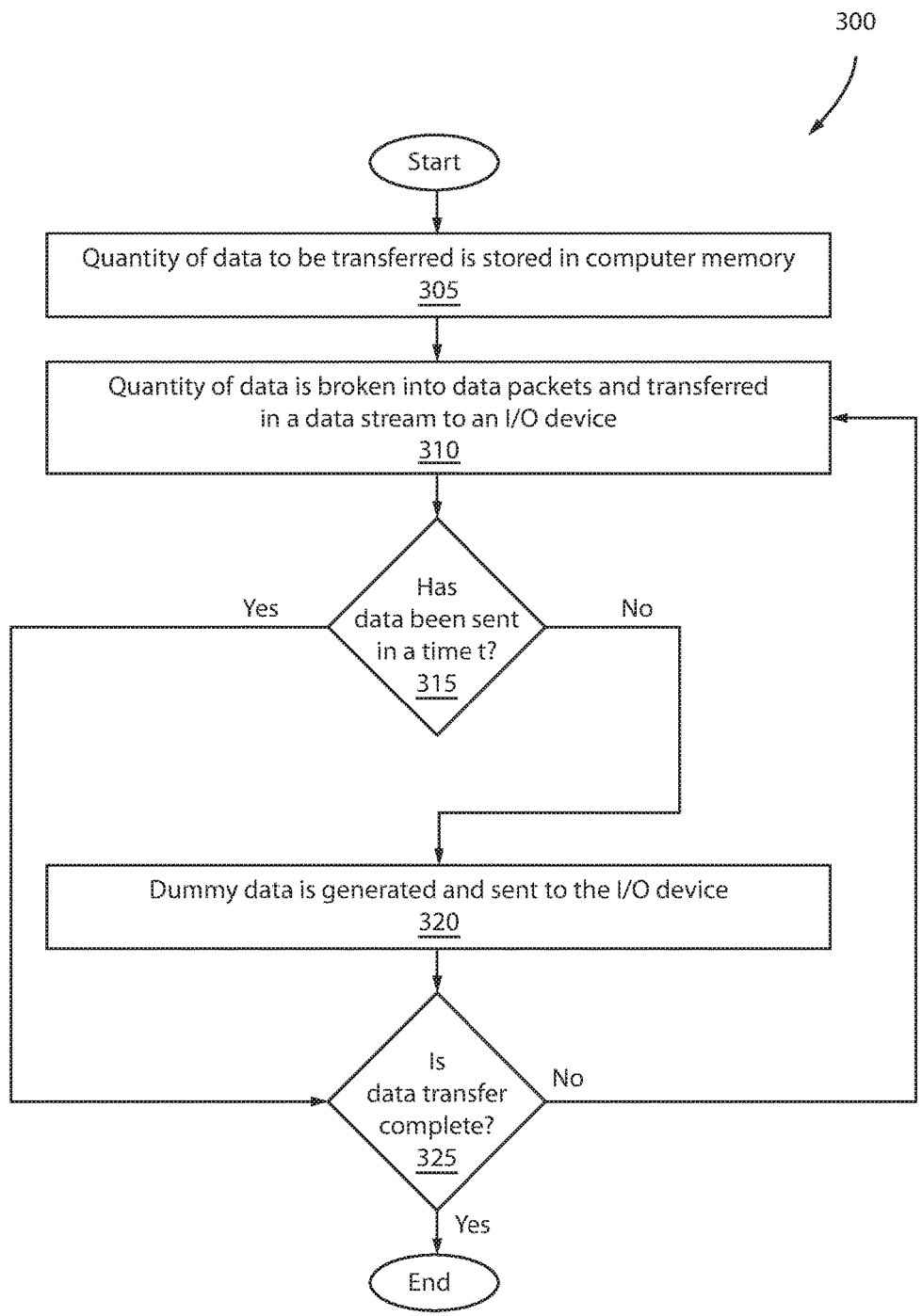
FIG. 5 shows an exemplary method for preventing time out from occurring during transfer of data to an I/O device, in accordance with an embodiment of the present principles.

Referring to FIG. 5, an exemplary method 300 for preventing time out from occurring during transfer of data to an I/O device, in accordance with an embodiment of the present principles, is shown.

In block 305, a quantity of data to be transferred is stored in computer memory

In block 310, the quantity of data is broken into data packets and is transferred in a data stream to an I/O device. As indicated, the data can be probed and then broken into packets that can be processed by a data buffer.

In block 315, a decision is made on whether data has been sent to an I/O device during a time period t. If the answer is YES, then proceed to decision block 325. If the answer is NO, then proceed to block 320.

In block 320, dummy data is generated and transferred to the I/O device. This activity prevents the data transfer operation from reaching time out, which would terminate the data transfer operation.

In block 325, a decision is made on whether the transfer of the quantity of data is complete. If the answer is YES, then proceed to END block 330, signifying that the end of the process has been reached. All data has been transferred and a time out event has been avoided or prevented. If the answer is NO, then return to block 310 to continue the transfer of data packets to the I/O device.

There are several advantages that flow from implementing the present principles, such as, e.g.:

(A) System resources are used efficiently. There is no need to discard transferred data that was transferred before a time out event occurred;

(B) The dummy data that is generated and transferred is labeled, so that it is distinguishable from the "real" data, e.g., the data that is intended to be the subject of transfer;

(C) Employing latency-reducing strategies in data transfer, e.g., sending a heading part of a packet before the packet is fully assembled, will not result in time out events since if time t is reached, dummy data will be generated and sent; and (D) The system can be implemented at relatively-low cost.

While the present disclosure includes a detailed description on cloud computing, it should be understood that implementation of the subject matter described herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises, Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
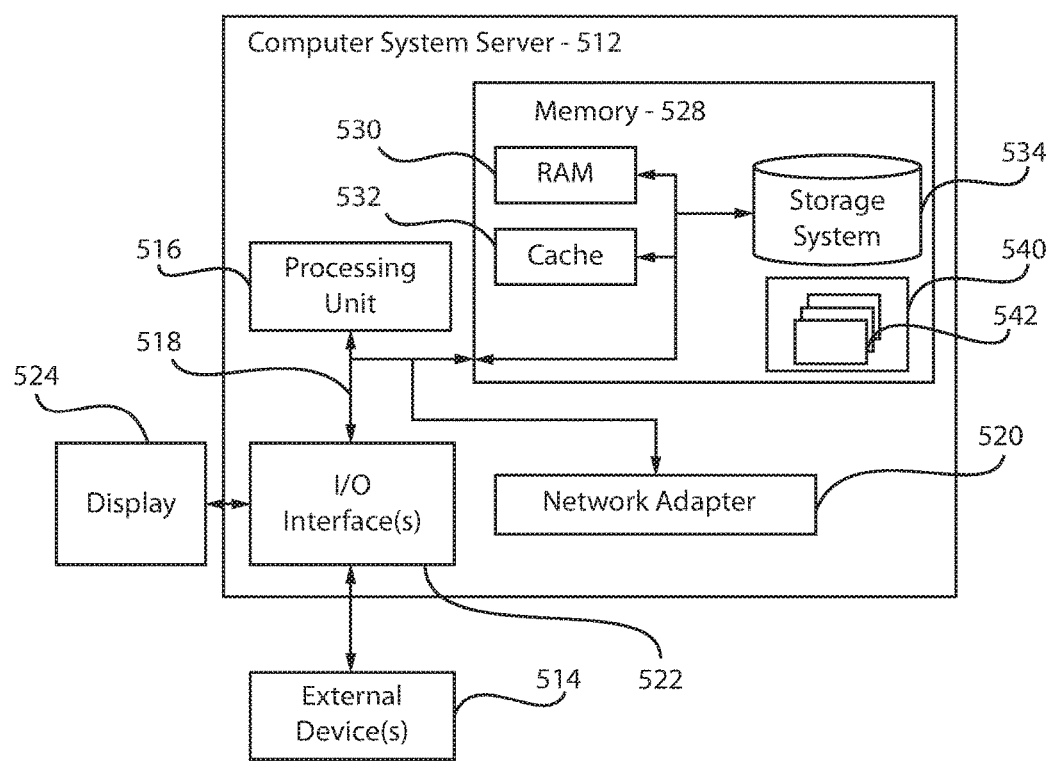
FIG. 6 shows an exemplary cloud computing node in accordance with an embodiment of the present principles.

Referring now to FIG. 6, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or ore external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 7:
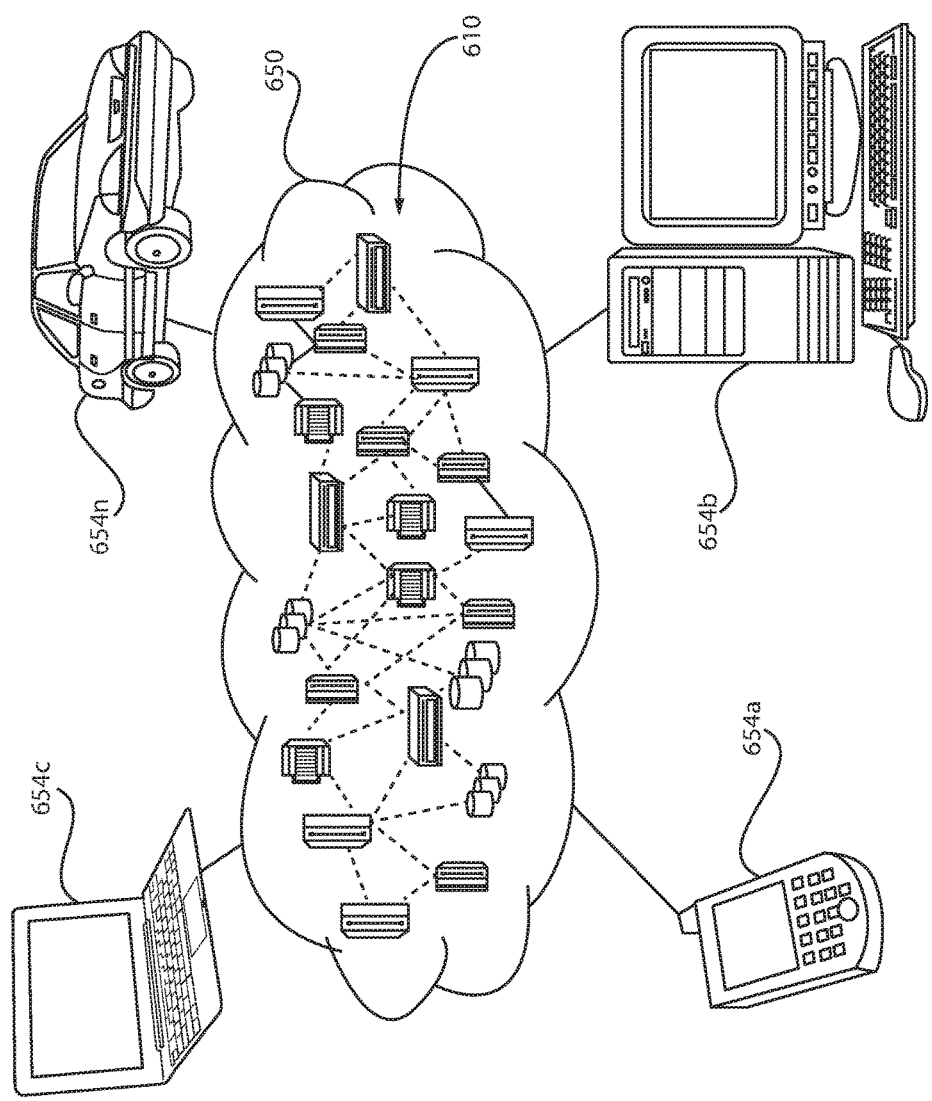
FIG. 7 shows an exemplary cloud computing environment in accordance with an embodiment of the present principles.

Referring now to FIG. 7, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 7 are intended to be illustrative only and that computing nodes 610 and cloud computing environment 650 can communicate with any type of computerized device over any type of network and/or network addressable connection (e.g., using a web browser).

Figure 8:
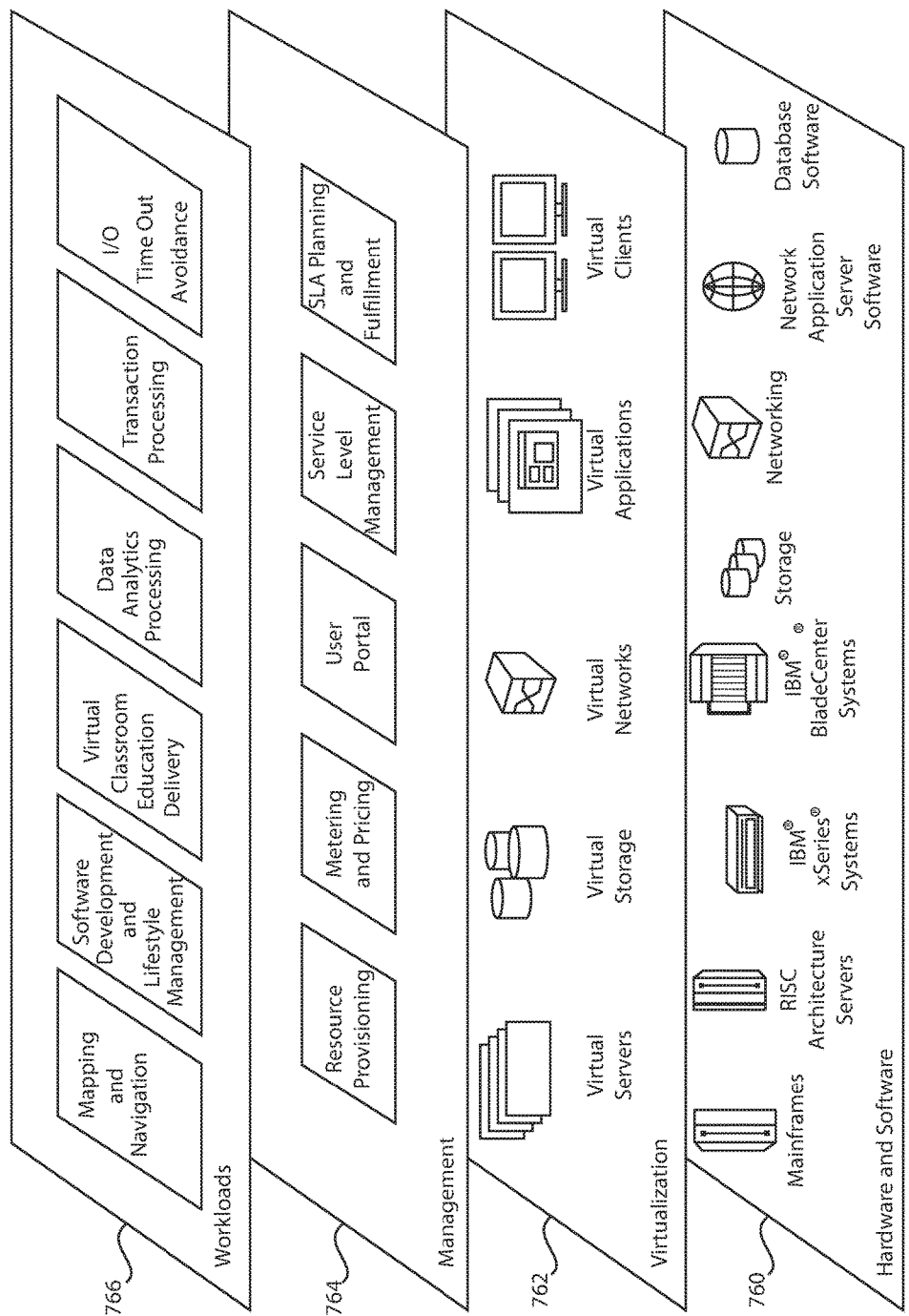
FIG. 8 shows exemplary abstraction model layers, in accordance with an embodiment of the present principles.

FIG. 8 shows a set of functional abstraction layers provided by cloud computing environment 650. It should be understood in advance that the components, layers, and functions shown in FIG. 8 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software, (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and I/O device time out avoidance.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for preventing time out from occurring during transfer of data to an I/O device, which are intended to be illustrative and not limiting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for preventing time out from occurring during transfer of data to an input/output device, comprising:
    storing, in a computer memory, a quantity of data to be transferred to an input/output device;
    transferring the quantity of data in a data stream to the input/output device in packets of data;
    generating dummy data at a designated time before data transfer will time out;
    inserting the dummy data into the data stream; and
    completing the transfer of the quantity of data, wherein one or more of the transferring, the data dummy generating, and the data dummy inserting are performed by at least one hardware processor.

2. The method of claim 1, further comprising breaking the quantity of data into the packets of data in a data buffer.

3. The method of claim 2, further comprising inserting dummy data into the data stream upstream of the data buffer.

4. The method of claim 2, further comprising inserting dummy data into the data stream downstream of the data buffer.

5. The method of claim 1, further comprising sequencing the dummy data and data packets in the data stream.

6. The method of claim 1, wherein the designated time before data transfer will time out is after a time period t has elapsed, where t<a predetermined, time out time period $T_{out}$.

7. The method of claim 1, further comprising labeling the dummy data with a tag to distinguish the dummy data from the quantity of data being transferred.

8. A system for preventing time out from occurring during transfer of data to an input/output device, comprising:
    one or more processors including memory for storing a quantity of data to be transferred to an input/output device in a data transfer;
    a data prober, for probing the quantity of data and forwarding the quantity of data to an input/output controller;
    the input/output controller, for breaking the quantity of data into data packets and for transferring the data packets in a data stream;
    the input/output device, for receiving the data stream transferred by the input/output controller; and
    a data dummy generator, for generating dummy data and inserting the dummy data in the data stream, the data dummy generator being configured to generate dummy data and insert same into the data stream at a selected time in order to avoid a time out condition from occurring during the data transfer.

9. The system of claim 8, further comprising a data buffer configured in the input/output controller.

10. The system of claim 8, wherein the data dummy generator is configured to insert dummy data into the data stream downstream of a data buffer that is configured in the I/O controller.

11. The system of claim 8, wherein the data dummy generator is configured to insert dummy data into the data stream upstream of a data buffer that is configured in the I/O controller.

12. The system of claim 8, further comprising a multiplexor, for sequencing the dummy data and data packets in the data stream, the multiplexor being located upstream of a data buffer configured in the input/output controller.

13. The system of claim 8, further comprising a multiplexor, for sequencing the dummy data and data packets in the data stream, the multiplexor being located downstream of a data buffer configured in the input/output controller.

14. The system of claim 8, wherein the selected time in order to avoid a time out condition from occurring is a time period t, where t<a predetermined time out time period $T_{out}$.

15. The system of claim 8, wherein the data dummy generator is configured to label the dummy data with a tag to distinguish the dummy data from the quantity of data being transferred.

16. A computer program product for preventing time out from occurring during transfer of data to an input/output device, the computer program product comprising a non-transitory computer readable storage medium having program instructions embodied therewith, the program instructions being executable by a computer to cause the computer to perform a method comprising:

storing, in a computer memory, a quantity of data to be subjected to a data transfer;

transferring the quantity of data in a data stream to an input/output device in packets of data;

generating dummy data at a designated time before data transfer will time out;

inserting the dummy data into the data stream; and completing the transfer of the quantity of data.

17. The computer program product of claim 16, wherein the program instructions executable by a computer cause the computer to perform the method that further comprises:

inserting dummy data into the data stream upstream of the data buffer.

18. The computer program product of claim 16, wherein the program instructions executable by a computer cause the computer to perform the method that further comprises:

inserting dummy data into the data stream downstream of the data buffer.

19. The computer program product of claim 16, wherein the program instructions executable by a computer cause the computer to perform the method that further comprises:

determining the designated time before data transfer will time out by determining if a time period t has elapsed, where t<a preermined time out time period $T_{out}$, and generating the dummy data and inserting the dummy data into the data stream after the time period t has elapsed and before the end of predetermined time out time period $T_{out}$.

20. The computer program product of claim 16, wherein the program instructions executable by a computer cause the computer to perform the method that further comprises:

labeling the dummy data with a tag to distinguish the dummy data from the quantity of data being transferred.

* * * * *